US005396816A

United States Patent [19]

Derksen et al.

[11] Patent Number: 5,396,816

[45] Date of Patent: Mar. 14, 1995

[54] SINGLE POWERED DUAL MOVEMENT MOTION DEVICE

[76] Inventors: Howard W. F. Derksen, 713 Melrose Ave., Saskatoon, Saskatchewan, Canada, S7N 0Y6; Roger L. Patterson, Box 6, Group 351, R.R. #3, Selkirk, Manitoba, Canada, R1A 2A8

[21] Appl. No.: 51,330

[22] Filed: Apr. 23, 1993

Related U.S. Application Data

[62] Division of Ser. No. 796,314, Nov. 22, 1991, Pat. No. 5,271,707.

[51] Int. Cl.[6] .............................................. F16H 31/00

[52] U.S. Cl. ..................................... 74/89.21; 74/103; 414/917

[58] Field of Search ............ 414/680, 718, 728, 744.5, 414/749, 687, 917, 921; 74/89, 89.21, 103, 526; 254/8 R, 124; 182/2

[56] References Cited

U.S. PATENT DOCUMENTS

| | | | |
|---|---|---|---|
| 2,972,467 | 2/1961 | Gilman | 74/89 X |
| 3,124,009 | 3/1964 | Grover | 74/89 X |
| 3,312,980 | 4/1967 | Erbach | 74/103 X |

*Primary Examiner*—Donald W. Underwood

[57] ABSTRACT

A single powered dual movement motion device preferably mounted on the distal end of a boom and connected to a platform adapted to carry a wheel chair of a handicapped person. The motion device has a base frame that mounts it on the boom. A first extension frame is pivotally connected to the base frame and a second extension frame is hingedly connected to the first extension frame. A reversible rotatable drive assembly is fixed to the base frame and is driven by a reversible power source. The reversible rotatable drive assembly includes a release and lock means whereby an arcuate path will be given to an extremity of the second extension frame in the release mode and a straight forward path in the locked mode. A reversal of the power source will reverse the sequence of events.

5 Claims, 6 Drawing Sheets

SINGLE POWERED DUAL MOVEMENT MOTION DEVICE

This is a divisional of allowed parent case 07/796,314, filed Nov. 22, 1991, now U.S. Pat. No. 5,271,707. The present invention relates to object transporting devices and in particular the multi directional transporting of a person from one location to another by remote and/or direct positioning control of the device.

BACKGROUND OF THE INVENTION

There has been an ever increasing effort by individuals and industry to increase the mobility of handicapped persons. The manual wheel chair soon gave way to the motorized wheel chair with the accompanying accomodation required in gaining access to various buildings and in particular public buildings. With the desire or need for many of these persons to perform various tasks especially those that require the transfer of the person from one work place or position to another various devices such as the instant invention have been invented.

Various types of aerial lift platforms have been provided but fail to satisfy the needs of transporting, in the simplest most positive manner, a handicapped person. The Canadian patent No. 1,157,395 to Grove et al teaches a mobile aerial lift platform apparatus. This apparatus while similar to applicants requires two boom lifting cylinders, it has an extensible boom cylinder and a platform levelling cylinder. Applicants device has one lifting cylinder and has a non extensible boom surrounding a self levelling platform link for continually supporting the platform in a level position. Applicants device also includes a remotely controllable or manually controllable hydraulic circuit for its operation.

An additional passenger platform patent is revealed in Canadian patent No. 1,220,434. This patent requires a basic boom, a central boom-part and a jib each operated by a piston-cylinder linkage while the platform is held horizontal by a reversible motor through a reduction gear and a control means including an inclinometer. As pointed out above applicants device has a single non extensible boom surrounding a connecting link for a continuous automatic mechanical levelling of the platform as it is lifted, swung and extended to a desired location.

A further passenger platform wheel chair lift is revealed in Canadian patent No. 1,087,555. This patent teaches a wheel chair support structure that slides on a track back and forth and is raised and lowered by winch means. While the platform remains level at all times there is absolutely no possible transverse motion of the platform and support arms nor is there provided any lateral pivoting of the platform at the end of the extended position as taught by applicants device.

SUMMARY OF THE INVENTION

The present invention provides an aerial lift for a handicapped person. The lift is generally mounted on and transported by a mobile vehicle to be operated by the handicapped person. The lift has a basically vertical mast and a boom and levelling link pivotally connected thereto. The levelling link and the boom are connected to a platform to receive the wheelchair of a handicapped person and position it in almost any desired location. The levelling link and boom are raised vertically by a vertical hydraulic cylinder in the mast and rotated by a hydraulic cylinder connected to the mast by a lateral linkage. The levelling link and boom are connected to the platform by pivotal extension structures operated by reversible hydraulic motors, the platform automatically remaining level at all times.

The hydraulic cylinders and reversible motors are controlled by solenoids in a hydraulic circuit which is controlled either remotely or manually.

In view of the above it is therefore considered a prime object of the present invention to provide a simple yet effective object positioning means.

A further object of the present invention is providing a mechanical self levelling platform or object supporting means.

A further object of the present invention is the providing of a versatile person or object lift apparatus to enable persons to access various types of buildings, vehicles or machinery.

Yet a further object of the present invention is the provision of a lift easily manipulated manually or remotely and which may be stored within the confines of the transporting vehicle.

Yet a further object of the present invention is the provision of a platform pivoted through a range of 360 for ease of access.

Yet a further object of the present invention is the provision of a controlled bleed-down if the system fails.

These and other objects of the present invention will become readily apparent as the following description is read in conjunction with the accompanying drawings wherein like reference numerals indicate like elements throughout the several views.

DETAILED DESCRIPTION OF PREFERRED EMBODIMENT

Figure 1:
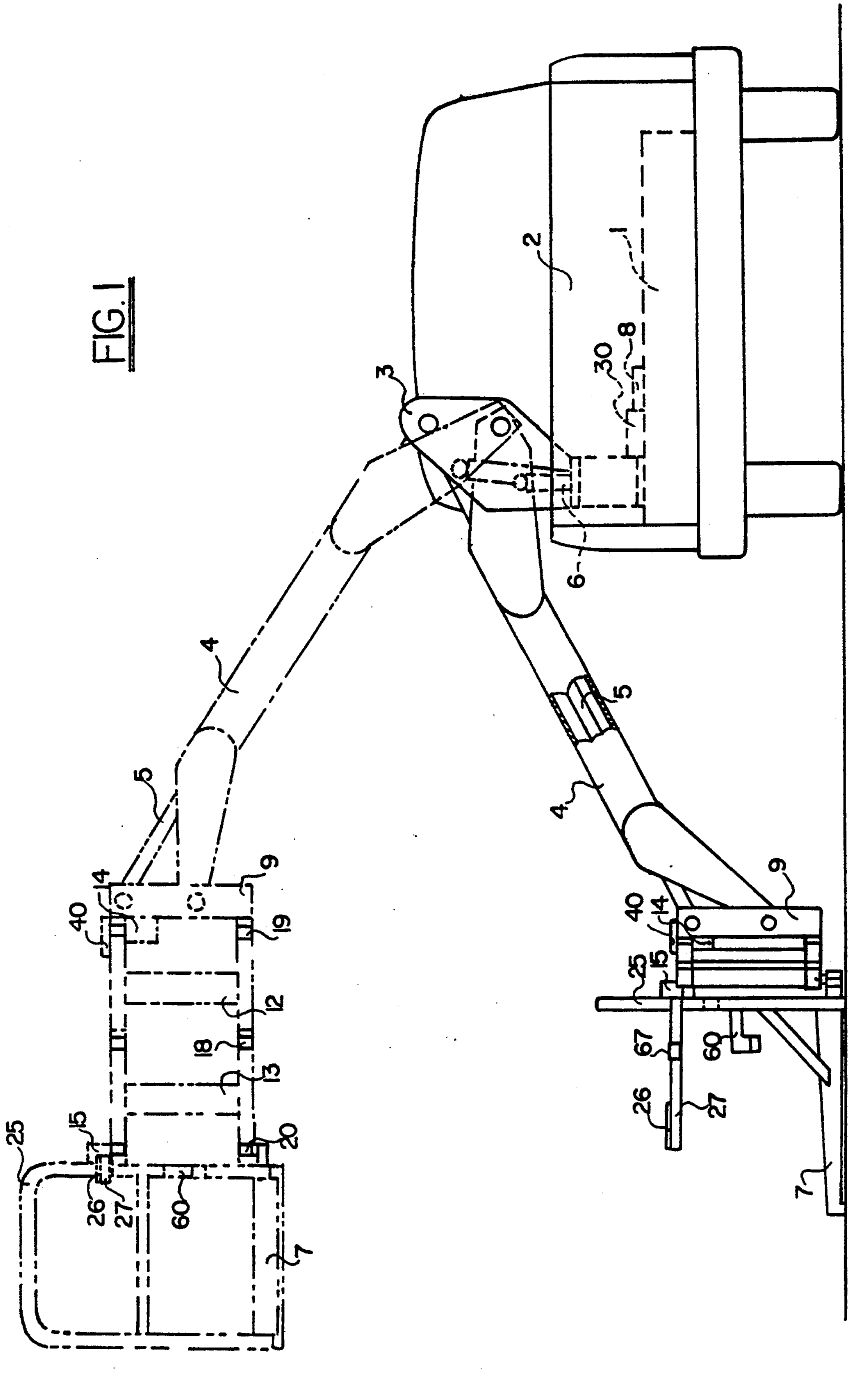
FIG. 1 is a schematic elevation of the aerial lift shown mounted on a vehicle in two positions, the lower position with the platform on the ground, an alternate position shows the platform in the air in an extended position and rotated or pivoted.
Figure 7:
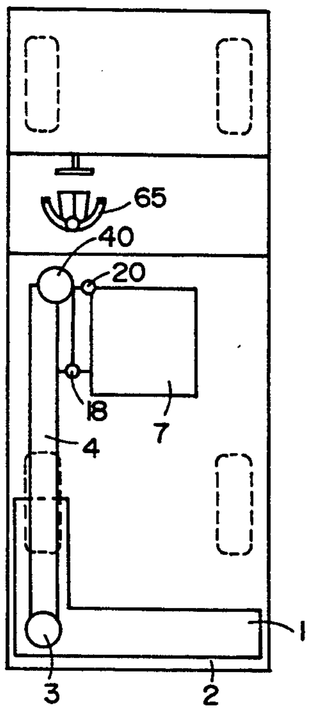
FIG. 7 is a schematic plan view of the aerial lift in the vehicle storage position.

Referring now to FIG. 1 there is shown an aerial lift with a base 1 mounted on a vehicle 2. The complete lift may be stored within the lateral confines of the vehicle for ease of storage and transportation. A schematic of the stored lift is shown in FIG. 7. The lift is normally set in motion from the stored position by an operator in a wheel chair on the ground using a remote signalling device that initiates the lift controls 26 normally mounted on the platform arm 27 attached to a platform back support 25 mounted upright on a platform base 7. The load is normally a person in a wheel chair but is not so limited. When used by a person in a wheel chair, a wheel chair interlock and seat belt 60 is used for the safety of the user and is usually attached to the platform back support 25. A manual bleed-down valve 67 of lift cylinder 6 is usually mounted on the platform arm 27, is further shown in FIG. 8 and is used in the event of a malfunction to avoid leaving one stranded in mid air. When a user on the ground requires the use of the lift the actuated controls pivot the boom 4 and levelling link 5 vertically to clear the vehicle 2. The boom 4 and levelling link 5 are pivotally connected at their proximal end to a vertical mast 3 which can be rotatable or swung on its vertical axis by swing assembly 30 actuated by swing cylinder 8. The vertical mast 3 is held upright on base 1 and encloses and support a lift cylinder 6. The distal ends of boom 4 and levelling link 5 have a vertical frame post 9 pivotally mounted thereon. Between frame post 9 and platform back support 25 are a hinged first extension frame 12 and a second extension frame 13 pivotally connected thereto by first extension frame pivot pin 19 and second extension frame pivot pins 20 the hinging being accomplished by hinge pins 18. A primary drive assembly 40 provides an extension of the first and second extension frames 12 and 13 while a secondary drive pivot motor 15 provides a pivoting of the integral platform base 7 and platform back support 25. An alternate position is also presented that shows a lifted and swung boom 4 and levelling link 5, an extension of the first and second extension frames 12 and 13 respectively and a 90 pivoting of the integral platform base 7 and platform back support 25. It can readily be seen that in both the lowered and lifted positions of the boom 4 and levelling link 5 that the vertical frame post 9 remains vertical therefore requiring no special levelling devices.

Figure 2:
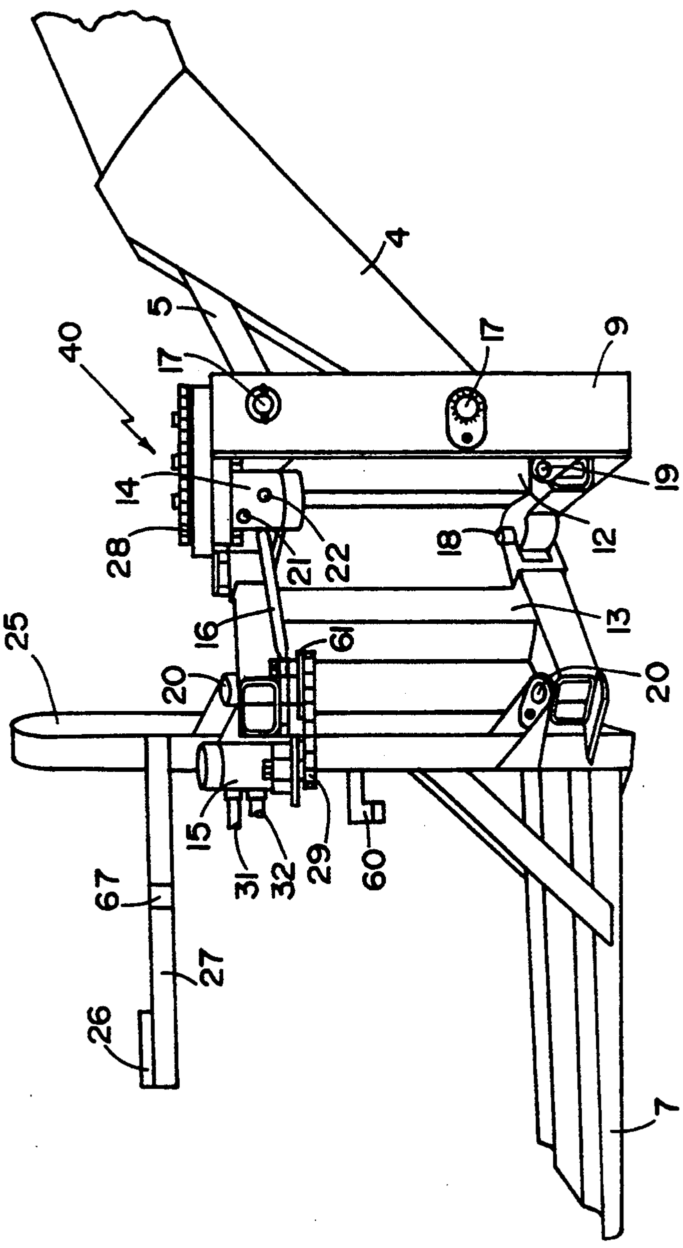
FIG. 2 is a front elevation of the platform and extension frames partially extended.

Now referring to FIG. 2 we show again the vertical frame post 9 pivotally connected by pins 17 to the distal ends of boom 4 and levelling link 5. This enlarged and more detailed version of the platform base 7 and its connection to the vertical frame post 9 shows the first extension frame 12 pivotally joined at its lower end to the vertical frame post 9 by a pivot pin 19, its upper end is clamped to primary drive pin 41 of primary drive assembly 40 more clearly shown in FIG. 5. The drive assembly 40 is powered by a two way primary drive hydraulic insert motor 14 supplied by fluid through the first and second primary drive motor conduits 21 and 22 respectively. The first extension frame 12 is hinged to the second extension frame 13 by extension frame hinge pins 18. The second extension frame 13 is pivotally mounted to the platform back support 25 at the top and bottom by second extension frame pivot pins 20. Mounted on platform back support 25 is a two way hydraulic secondary drive pivot motor 15, supplied by fluid through the first and second secondary drive motor conduits 31 and 32 respectively. A pinion driven by secondary drive pivot motor 15 drives a sprocket attached to sprocket plate 61 by means of a flexible connector 29 such as a roller chain or cog belt. Attached to sprocket plate 61 is a secondary drive tie-rod 16 which is connected at its other end to first extension frame 12 near the top hinge pin 18. The sprocket and sprocket plate 61 are pivotally supported on the upper second extension frame pivot pin 20. Pivot motor 15 provides for a 180° load platform movement for ease of access of a person to or from a vehicle or machine. In combination with motor 14 a total of 360° platform movement is accomplished.

Figure 3:
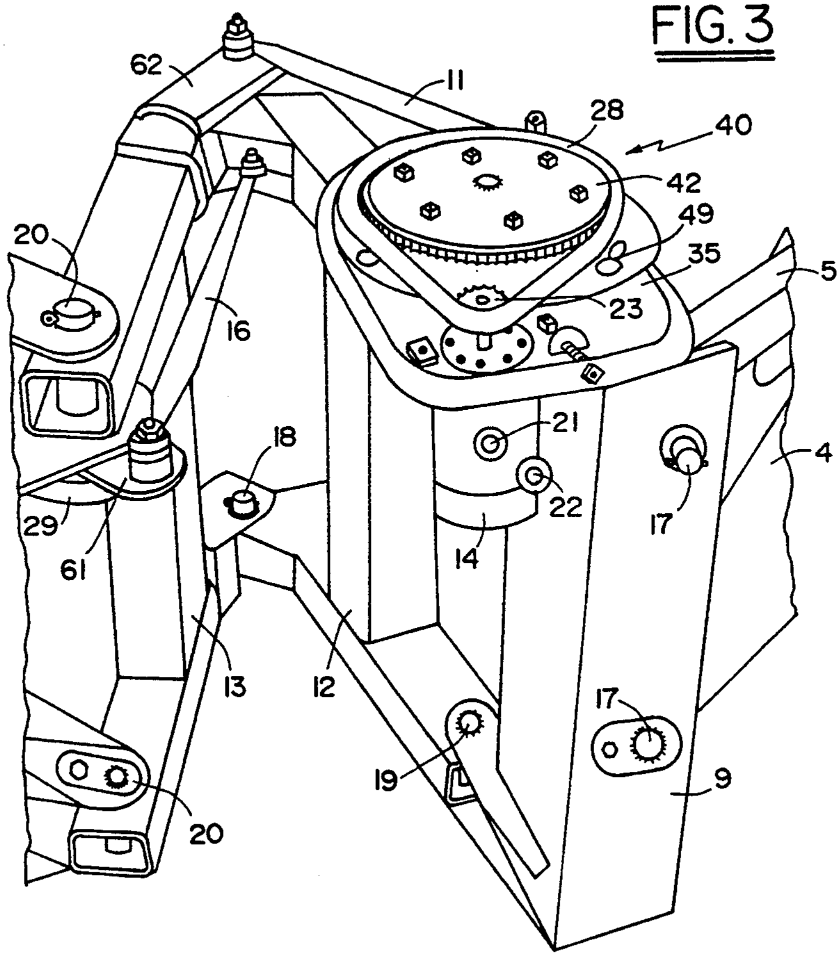
FIG. 3 is a perspective view of the first and second extension frames hinged together and pivotally mounted on the vertical frame post.
Figures 5, 6:
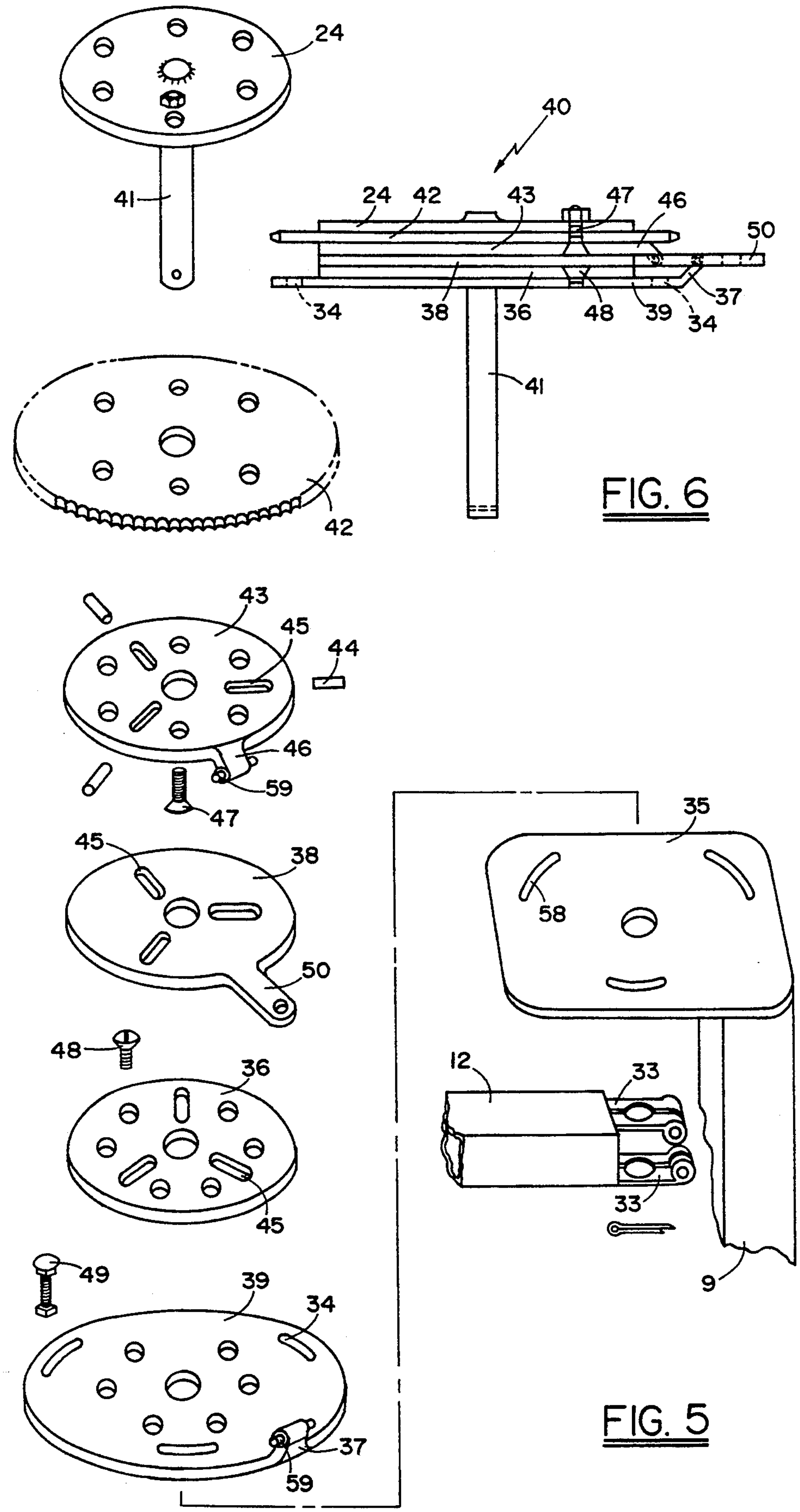
FIG. 5 is an exploded view of the primary drive assembly.
FIG. 6 is a side elevation of the assembled primary drive assembly.

We have shown in FIG. 3 an enlarged and more detailed perspective view of the mechanism between the boom end and the platform. The vertical frame post 9 is pivotally mounted on the distal end of boom 4 and levelling link 5 by vertical frame post pins 17. First extension frame 12 is pivotally mounted to the vertical frame post 9 by a first extension frame pivot pin 19 at the lower end and through the primary drive assembly 40 at the upper end. The primary drive assembly 40 is adjustably mounted on adjustment mount 35 which is fixed to vertical frame post 9. A primary drive pin or axle 41 shown in FIG. 6 is clampingly fixed to the upper end of first extension frame 12. Actuation of the primary drive insert motor 14 drives primary drive pinion 23 which drives primary drive roller chain 28 or any other suitable flexible connector such as a cog belt which drives primary drive sprocket 42 and thereby pivots first extension frame 12. The function of the primary drive tie-rod 11 will be more fully explained during the description of FIG. 5. The primary drive tie-rod 11 is connected at one end to the primary drive assembly 40 and at its other end to a second extension frame protrusion 62 fixed to second extension frame 13.

Figure 4:
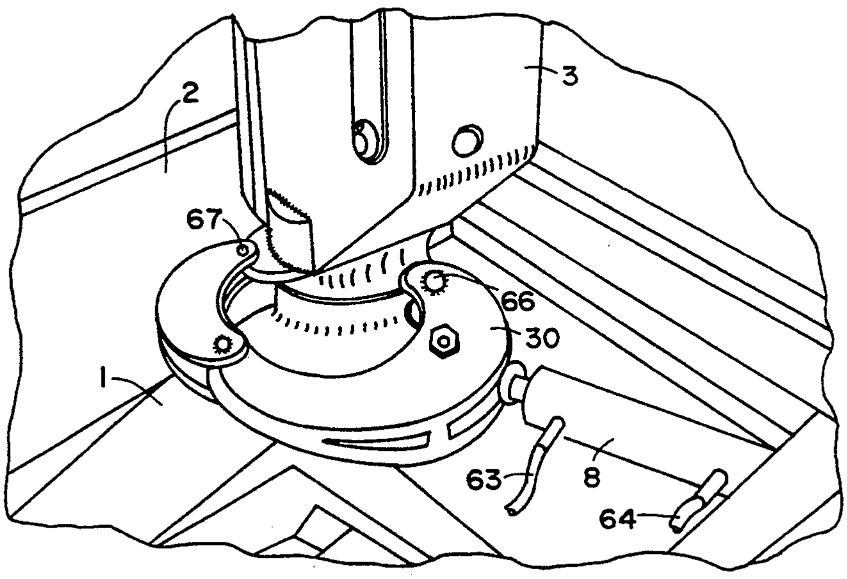
FIG. 4 is a perspective view of the mast swing assembly.

Now referring to FIG. 4 we have the base 1 of the lift mounted on a vehicle 2. Upwardly and rotatably mounted on the base 1 is a mast 3 which pivotally supports the proximal end of boom 4 and levelling link 5. Inside of the mast 3 is the lift cylinder 6 for vertical movement of the boom 4. Rotation of the mast 3 is accomplished by a curved jointed swing assembly 30 which is operated by a swing cylinder 8 fed by first and second swing cylinder conduits 63 and 64 respectively. The swing covers 180° from a straight forward position of vehicle 2 to a straight back position of vehicle 2. The swing assembly 30 is pivotally mounted on base 1 by pivot pin 66 and pivotally secured to mast 3 by pivot pin 67.

FIG. 5 is an exploded view of primary drive assembly 40 along with its mounting in the form of adjustment mount 35 fixed to vertical frame post 9. There is also shown an upper portion of first extension frame 12 which includes primary drive pin clamps 33 to clamp primary drive pin 41 so that any movement of primary drive sprocket 42 will result in torque being transferred to the first extension frame 12. Primary drive sprocket 42 receives power from primary drive insert motor 14 by means of primary drive roller chain 28. Since the primary drive hub 24 with welded primary drive pin 41 and top bearing plate 43 are bolted together as a unit by six countersunk bolts. Any torque applied to primary drive sprocket 42 results in torque being transferred to all the connected parts. The top bearing plate 43 has three drive roller slots 45 which are of a size to freely rollably control laterally the movement of drive rollers 44 which are of a thickness greater than the top bearing plate 43 and are preferably twice the thickness of the top bearing plate 43, or the control plate 38 or the bottom bearing plate 36, all being the same thickness. A preferred embodiment as shown in FIG. 6 has the hub, the sprocket, the top bearing plate, the control plate, the bottom bearing plate and the adjustment plate all of equal thickness. The dive roller positioned in drive roller slots have a diameter equal in thickness to any two of the above plates, the drive roller slots are generally tapered to assist in the rollers up and down movement. The top bearing plate 43 has a top stop lever 46 carrying an adjustable stop bolt precisely positioned by shims 59. Beneath top bearing plate 43 is a control plate 38 which also has three corresponding drive roller slots 45 and a stop control arm 50 which has connected to it the primary drive tie-rod 11 shown in FIG. 3. Beneath control plate 38 is bottom bearing plate 36 which also has three corresponding drive roller slots 45. Beneath bottom bearing plate 36 is adjustment plate 39 which is fastened to bottom bearing plate 36 by six countersunk screws 48. Adjustment plate 39 has three adjustment plate slots 34. A bottom stop lever 37 carries an adjustable stop bolt precisely positioned by shims 59. Beneath adjustment plate 39 is adjustment mount 35 which carries three adjustment mount slots 58 which correspond with the adjustment plate slots 34. Adjustment bolts 49 clampingly hold adjustment plate 39 to adjustment mount 35 which is fixed to the vertical frame post 9. Beneath the adjustment mount 35 are two primary drive pin clamps 33 to hold primary drive pin 41 in a fixed relationship to first extension frame 12.

The design of the assembly of FIG. 5 is to provide a means of using one rotary actuator in the form of the primary drive insert motor 14 to give two distinct movements. When the boom 4 is lifted and swung to the side of the vehicle 2 the primary drive insert motor 14 can drive primary drive sprocket 42 counter clockwise to pivot attached first extension frame 12 away from its storage position against boom 4. This is achieved when the adjusted bolt in the top stop lever 46 abuts the stop control arm 50 and the drive roller slots are aligned with the rollers 44 locking them together for rotation with a movement of primary drive tie-rod 11. When the control arm stop 50 abuts the adjusted bolt in the bottom stop lever 37 which is fixed, continued torque and chamfered edges of the slots causes a transfer of rollers 44 out of top bearing plate 43 into slots 45 of control plate 38 and bottom bearing plate 36. With the primary tie-rod 11 now held and the first extension frame 12 free to continue pivoting by a continued motion of the sprocket a straight line insert motion is accomplished for the load platform 7 pivotally mounted on the second extension frame 13. A retraction of the load platform 11 can be achieved by a reversal of the above steps.

With reference to FIG. 6 we have the primary drive assembly 40 with the primary drive hub 2, the primary drive sprocket 42 and the top bearing plate united by six top assembly countersunk bolts 47. The bottom bearing plate 36 and the adjustment plate 39 are both united by six bottom assembly screws 48.

Figure 8:
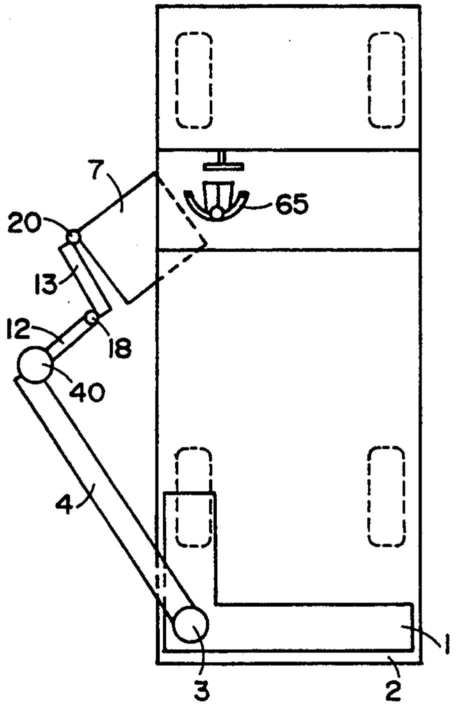
FIG. 8 is a schematic plan view of the aerial lift in the vehicle occupant entry or exit position.
Figure 9:
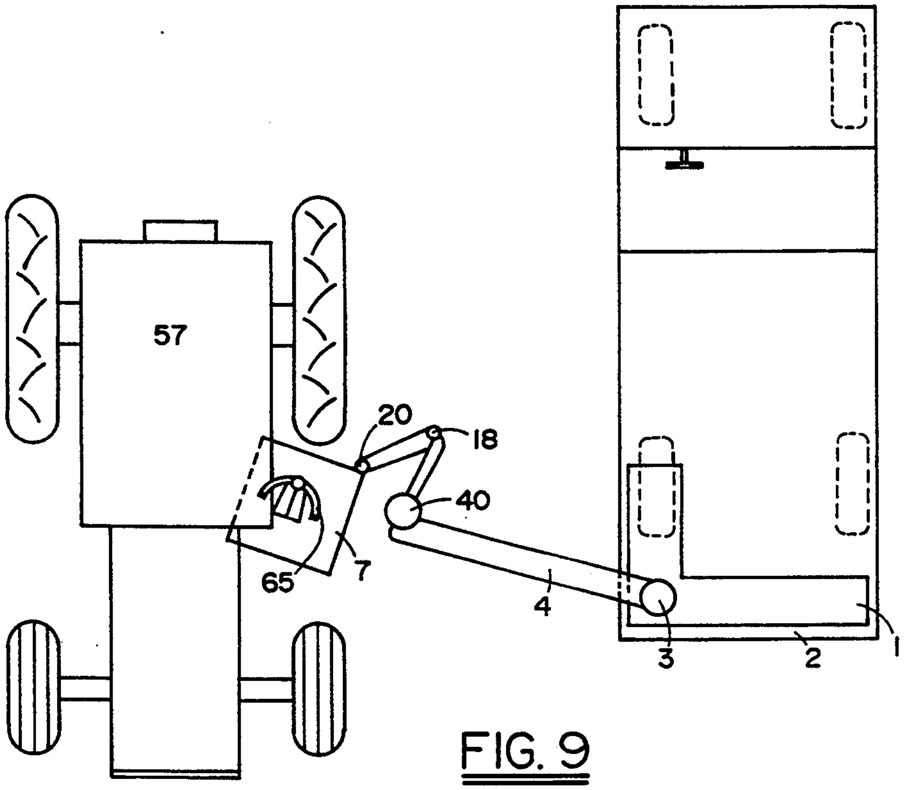
FIG. 9 is a schematic plan view of the aerial lift in the vehicle transfer position.
Figure 10:
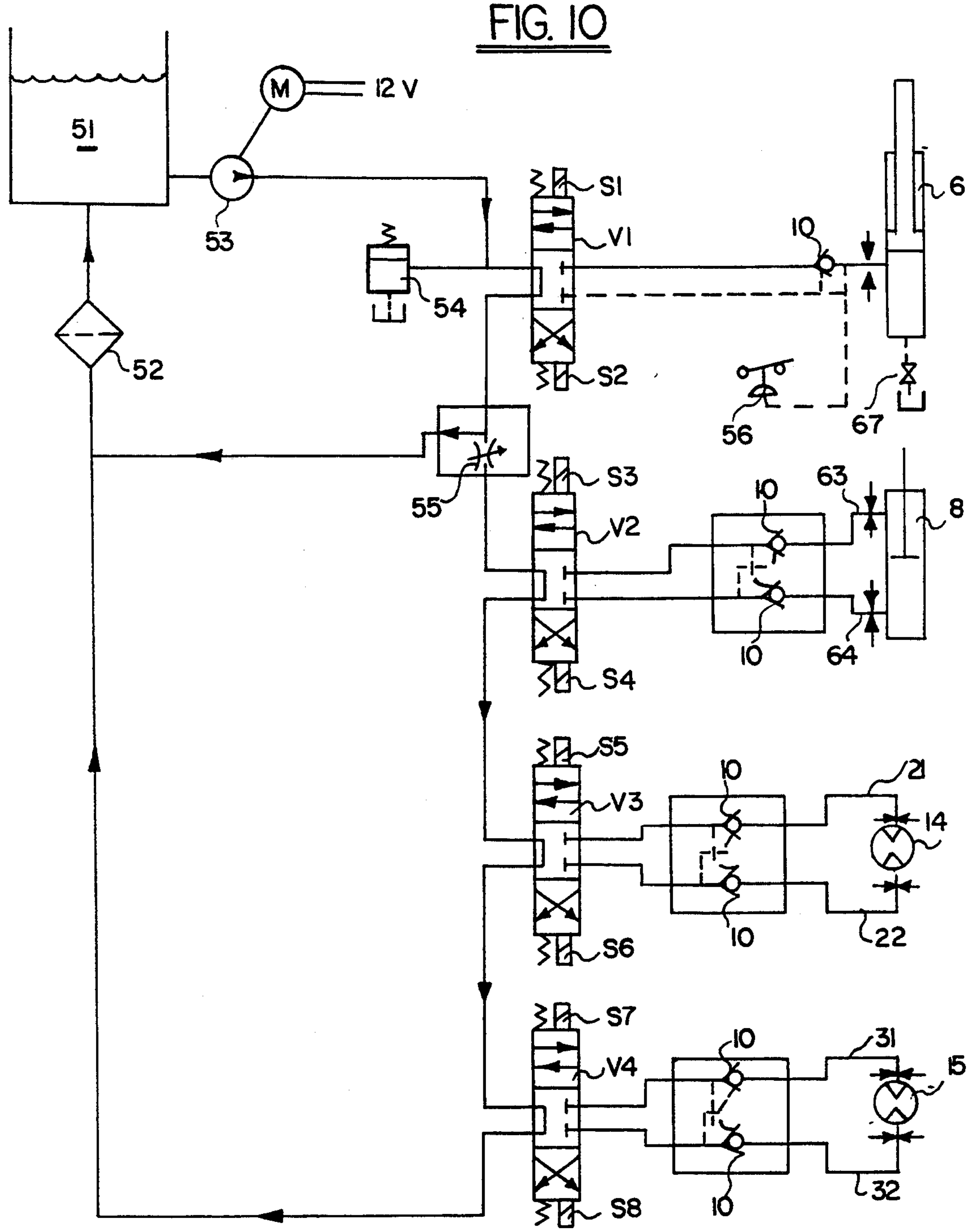
FIG. 10 is a schematic diagram of the hydraulic control system.

To show a specific schematic application of the invention we have shown three stages in FIGS. 7, 8 and 9. 7 shows a disabled person 65 seated in a vehicle 2. The disabled person 65 could have achieved this location by first of all placing himself or herself next to the vehicle 2 in a wheel chair and by remote control have the stored lift shown in FIG. 7 positioned on the ground as shown in FIG. 1. The person 65 with wheel chair moves onto the load platform 7. Before powered functions can be operated through lift controls 26 the wheel chair interlock and seatbelt 60 must be secured. With controls 26 the person 65 can be moved to the entry or exit position shown in 8 so that access to the vehicle 2 can be achieved. The lift can by remote controls then be replaced to the storage position as in FIG. 7.

When the person is desirous of gaining access to a machine 57 the person 65 in vehicle 2 would by remote control have the lift placed in the exit or entry position shown in FIG. 8. The person 65 would then place himself on the load platform 7 and by lift controls 26 place himself in a position shown in FIG. 9 to enable access to machine 57. The lift would then by remote controls be replaced in the storage position of FIG. 7.

Now referring to FIG. 8 we have a schematic diagram of the hydraulic system controlled by the remote controls or by the lift controls 26 located on the platform arm 27 as shown in FIG. 1. We have a static supply or fluid source 51 which provides fluid to a fluid pump 53 operated by a 12 V power supply. The fluid pressure after leaving the pump is limited to a pressure of approximately 2000 p.s.i. by fluid relief valve 54. The hydraulic fluid is firstly made available to the lift cylinder 6 through a three position four way valve V1 at a typical pressure of approximately 1300 p.s.i. and a flow rate of 0.75–1.0 U.S. gallons per minute. Valve V1 is operated by solenoids S1 and S2 from the remote control or lift control 26. A pressure switch 56 in the return is also set for approximately 2000 p.s.i. A manual bleed-down valve 67 of lift cylinder 6 is usually mounted on the platform arm 27 and is used in the event of a malfunction to avoid leaving one stranded in mid air. The hydraulic fluid after having passed through V1 is made available to a three position four way valve V2 after having passed through a variable flow control valve 55. The flow is controlled to approximately 0.20 U.S. gallons per minute and is set at a desirable rate initially before use depending upon various conditions. The valve V2 through the operation of solenoids S3 and S4 permits a two way action of swing cylinder 8. After having passed through V2 the hydraulic fluid is now available to valve V3 and through the operation of solenoids S5 and S6 enables a two way operation of the primary drive insert motor 14. After having passed through V3 the hydraulic fluid is now available to valve V4 and through the operation of solenoids S7 and S8 enables a two way operation of secondary drive pivot motor 15. Valves V1, V2, V3 and V4 are all three position 4way valves operated by solenoids from the remote control or lift controls 26. The fluid return from cylinders or motors being controlled by check valves 10. All valve return fluid is filtered by a fluid filter 52 before returning to the source 51.

A hydraulic system with valves, pistons and motors has been disclosed, however, it is not beyond the ambit of this invention to substitute for their use electric or electro-mechanical motors and drives.

Although the invention has been described with a certain degree of particularity it is understood that the present disclosure has been made only by way of example and that numerous changes in the details of construction and the combination and arrangement of parts may be resorted to without departing from the spirit and scope of the invention as hereinafter claimed.

What we claim is:

1. A dual movement single powered motion device comprising a base frame, a first extension frame pivotally connected to said base frame, a second extension frame hingedly connected to said first extension frame, a rotatable power source fixed to said base frame, a rotatable drive assembly mounted on said base frame and driven by said rotatable power source, said rotatably drive assembly including a driven shaft clamped to said first extension frame for pivotal movement thereof, and including a release and lock means, a tie-rod connecting said release and lock means to said second extension frame whereby upon rotation of said rotatable power source, the rotatable drive assembly will produce an arcuate path to an extremity of said second extension frame in the released mode and a straight forward path in the locked mode.

2. A dual movement single powered motion device as claimed in claim 1 wherein the rotatable drive assembly further includes a sprocket for receiving power from the rotatable power source, a hub fixed to said driven shaft and to said sprocket, said release and lock means comprising, a top bearing plate fixed to said sprocket, drive roller slots in said top bearing plate, drive rollers in said drive roller slots, a top lever with an adjustable stop bolt fixed to said top bearing plate, a control plate, drive roller slots in said control plate, a stop control arm fixed to said control plate including an aperture to pivotally receive a first end of said tie-rod, a bottom bearing plate, drive roller slots in said bottom bearing plate, an adjustment plate, said bottom bearing plate being fixed to said adjustment plate, a bottom stop lever with an adjustable stop bolt fixed to said adjustment plate, said adjustment plate being fixed to the base frame by means of an adjustment mount, whereby at the beginning of an initial counterclockwise movement of said sprocket, said top stop lever adjustable bolt engages said stop control arm so that said drive roller slots of said top bearing plate and said control plate are aligned allowing said drive rollers which are of a diameter greater than the thickness of either the control plate or the top bearing plate to engage said top bearing plate and said control plate so that the counterclockwise movement of said sprocket moves said control plate until said stop control arm abuts said bottom stop lever adjustable stop bolt at which time the drive roller slots in said control plate and said bottom bearing plate are aligned allowing the drive rollers to drop down locking said control plate to said base frame which prevents movement of said tie-rod, this locked mode produces the straight line motion of said second extension frame extremity as said sprocket continues to rotate.

3. A dual movement single powered motion device as claimed in claim 2 wherein the hub, the sprocket, the top bearing plate, the control plate, the bottom bearing plate and the adjustment plate are of equal thickness.

4. A dual movement single powered motion device as claimed in claim 3 wherein the drive rollers have a diameter equal in thickness to any two of the said plates.

5. A dual movement single powered motion device as claimed in claim 6 wherein the drive roller slots are tapered to assist in the rollers up and down movement to the released or locked position.

* * * * *